United States Patent
Lapiotis et al.

(10) Patent No.: US 10,439,886 B2
(45) Date of Patent: Oct. 8, 2019

(54) ANALYTICS-DRIVEN DYNAMIC NETWORK DESIGN AND CONFIGURATION

(71) Applicant: TELEFONAKTIEBOLAGET L M ERICSSON (PUBL), Stockholm (SE)

(72) Inventors: George Lapiotis, Edgewater, NJ (US); Chirag Parekh, Piscataway, NJ (US); Henry Chang, Metuchen, NJ (US); Kiran Patel, Piscataway, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 415 days.

(21) Appl. No.: 14/798,110

(22) Filed: Jul. 13, 2015

(65) Prior Publication Data
US 2017/0019302 A1    Jan. 19, 2017

(51) Int. Cl.
*H04L 12/24* (2006.01)
*H04L 12/26* (2006.01)

(52) U.S. Cl.
CPC ........ *H04L 41/145* (2013.01); *H04L 41/0813* (2013.01); *H04L 41/16* (2013.01); *H04L 43/16* (2013.01)

(58) Field of Classification Search
CPC ............ H04L 41/0893; H04L 41/0816; H04L 41/145; H04L 41/0813
See application file for complete search history.

(56) References Cited

U.S. PATENT DOCUMENTS

| | | | |
|---|---|---|---|
| 2009/0204621 A1* | 8/2009 | Fagioli | G06Q 10/10 |
| 2010/0223157 A1* | 9/2010 | Kalsi | G06Q 30/06 705/26.1 |
| 2013/0063042 A1* | 3/2013 | Bora | H05B 33/0863 315/292 |
| 2015/0193543 A1* | 7/2015 | Poliakov | G06Q 30/02 707/738 |
| 2016/0248860 A1* | 8/2016 | Dunbar | H04L 67/16 |
| 2016/0301779 A1* | 10/2016 | Cui | H04L 45/566 |

* cited by examiner

*Primary Examiner* — Walter J Divito
*Assistant Examiner* — Anthony Luo (57) ABSTRACT

A system and method for dynamically (re)configuring a service network based on profile information obtained from a Big Data Analytics platform. Received dynamic situation profiles relative to network states, subscriber states, etc. may be compared against corresponding characteristic situation profiles. If there is a similarity, a dynamic design change action may be effectuated for changing configuration of at least a part of the service network, e.g., a service chaining mechanism, operating to service user data flows of the subscribers.

24 Claims, 7 Drawing Sheets

ANALYTICS-DRIVEN DYNAMIC NETWORK DESIGN AND CONFIGURATION

FIELD OF THE DISCLOSURE

The present disclosure generally relates to the field of networks. More particularly, and not by way of any limitation, the present disclosure is directed to analytics-driven dynamic network design and configuration, e.g., with respect to one or more services in a network.

BACKGROUND

Operators use different middlebox services or appliances, called inline services, such as Deep Packet Inspection (DPI), logging/metering/charging/advanced charging, Firewall, Intrusion Detection and Prevention (IDP), Network Address Translation (NAT), etc., to manage subscribers' traffic. These services have high requirements on throughput and packet inspection capabilities. They can be transparent or nontransparent to the end users. Services can be hosted on dedicated physical hardware or in virtual machines.

Service chaining may be required if the traffic needs to go through more than one inline service or service function. Moreover, if more than one chain of services is possible, the operator needs to configure the networking infrastructure efficiently so as to direct the right traffic via the right inline service path depending on service policies and requirements.

SUMMARY

The present patent disclosure is broadly directed to a scheme for providing analytics-driven dynamic network design and configuration with respect to a network, e.g., including one or more service functions (SFs) or virtual network functions (VNFs) in a service network. In one aspect, an embodiment of a method for network configuration comprises, inter alia, receiving, from a data analytics platform, a dynamic situation profile with respect to a particular situation defined in terms of one or more service user behavior events and/or one or more events pertaining to a state of a network servicing a plurality of service users. The dynamic situation profile preferably comprises values or measurements or other indicia corresponding to the service user behavior events and/or the network state events defining the particular situation, as monitored and gathered by the data analytics platform, which may be implemented as a Big Data Analytics platform. A similarity index between the dynamic situation profile and a characteristic situation profile corresponding to the particular situation may be determined (e.g., within a configurable tolerance or window), wherein the characteristic situation profile comprises allowable values (e.g., threshold values) with respect to the service user behavior events and/or the network state events defining the particular situation. If the similarity index is within an acceptable window, one or more control signals may be generated to effectuate a dynamic design change action for changing configuration of at least a part of the network operating to service data flows of the service users (e.g., a service chain mechanism provided in virtualized infrastructure).

In another aspect, an embodiment of a network element operative with a service network is disclosed. The claimed embodiment comprises, inter alia, a profile analyzer operative to receive from a data analytics platform a dynamic situation profile with respect to a particular situation defined in terms of one or more service user behavior events and/or one or more events pertaining to a state of a network servicing a plurality of service users. As set forth above, the dynamic situation profile preferably comprises values or measurements or other indicia corresponding to the service user behavior events and/or the network state events defining the particular situation, as monitored and gathered by the data analytics platform, which may be implemented as a Big Data Analytics platform. A matching module associated with the profile analyzer is configured to determine a similarity index between the dynamic situation profile and a characteristic situation profile corresponding to the particular situation, wherein the characteristic situation profile comprises allowable (e.g., threshold) values with respect to the service user behavior events and/or the network state events defining the particular situation. A dynamic service chain designer is operative responsive to receiving an indication that the similarity index between the dynamic situation profile and the characteristic situation profile is within an acceptable window, for generating one or more control signals to effectuate a dynamic design change action for changing configuration of at least a part of the network operating to service user data flows of the service users (e.g., a service chain mechanism provided in virtualized infrastructure).

In a still further aspect, an embodiment of a non-transitory computer-readable medium containing instructions stored thereon is disclosed for performing one or more embodiments of the methods set forth herein. In one variation, an embodiment of a configurable network comprises a service network that is architected as a Software Defined Network (SDN). In another variation, the service network may embody non-SDN architectures. In still further variations, the service network comprises a network having service functions that may be at least partially virtualized. It will therefore be realized that the teachings hereof may be practiced in any network having a combination of the foregoing features. Furthermore, it should be appreciated that the foregoing methods, systems, apparatuses and/or computer-readable media may be implemented within a variety of networks and/or network domains, e.g., as additional or alternative embodiments adapted for dynamic design and configuration of private, public and corporate networks, and data centers, personal networks, data communication networks, telecommunication networks, content delivery networks, enterprise networks, intranets, and the like. Since an embodiment of the present invention involving data analytics-driven network design and configuration may be used in any domain, whether service functions virtualized or not, example implementations may include but not limited to domains such as a telecom domain having wireless LTE service nodes (e.g., MME, PGW, SGW, etc.) as well as financial network domains having financial service nodes and healthcare domains having healthcare service nodes. It should therefore be appreciated that the term "service network", for purposes of the present patent application, may include any of the foregoing types of networks and/or domains, depending on the context and specific implementation.

Benefits of the present invention include, but not limited to, providing an embodiment that advantageously leverages Big Data Analytics to dynamically derive suitable rules for the instantiation, maintenance or termination of service functions based on real-time data gathering, monitoring and analysis. Because of the use of more up-to-date data, faster convergence to optimized placement and/or assignment of multi-instances of service functions may be achieved, either in reactive mode, proactive mode, or both, with respect to a service network having one or more service chaining policies. Moreover, as default assignments can be changed dynamically, service network operators can bring more services online without significantly impacting scalability. Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that one or more embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node (e.g., a router, switch, bridge, etc.) is a piece of networking equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). In some implementations, a network element may also include a network management element and/or vice versa. Subscriber end stations (e.g., servers, workstations, laptops, notebooks, palm tops, mobile phones, smartphones, multimedia phones, Voice Over Internet Protocol (VOIP) phones, user equipment, terminals, portable media players, GPS units, gaming systems, set-top boxes) may access or consume content/services provided over a packet-switched wide area public network such as the Internet via suitable service provider access networks. Subscriber end stations may also access or consume content/services provided on virtual private networks (VPNs) overlaid on (e.g., tunneled through) the Internet. Whereas some network nodes or elements may be disposed in wired communication networks, others may be disposed in wireless infrastructures. Further, it should be appreciated that example network nodes may be deployed at various hierarchical levels of an end-to-end network architecture. Regardless of the specific implementation, one skilled in the art will recognize that one or more embodiments of the present patent disclosure may involve a configurable network or a portion thereof, e.g., such as a service network having a plurality of network nodes (i.e., switches or elements interconnected in a topological arrangement) wherein one or more services or service functions having multiple instances (i.e., "service function replicas") may be placed for traversal by a plurality of subscriber data flows (generated by or involving any type of above-described subscriber end stations) according to known or otherwise preconfigured service requirements and/or dynamically (re)configurable service rules and policies. Additionally, one or more embodiments of the present disclosure may be practiced in a service network that may be implemented in a Software Defined Network (SDN) architecture, which may further involve varying levels of virtualization, e.g., virtual appliances for supporting virtualized service functions or instances a suitable network function virtualization (NFV) infrastructure.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices (e.g., an end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device may be configured to store code and/or data for execution on one or more processors of that electronic device for purposes of implementing one or more techniques of the present disclosure.

Figure 1:
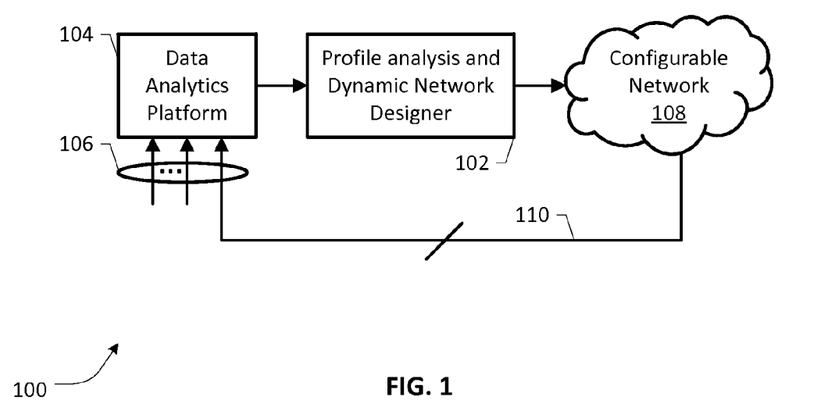
FIG. 1 depicts an example network architecture wherein one or more embodiments of the present patent application may be practiced for configuring or reconfiguring a network based on dynamic profile information obtained from a data analytics platform.

Turning now to FIG. 1, depicted therein is an example network architecture 100 wherein one or more embodiments of the present invention may be practiced for configuring or reconfiguring a network 108 based on dynamic profile information obtained from a data analytics platform 104. For purposes of the present patent disclosure, the terms "configure" and "reconfigure" will be used somewhat interchangeably depending on the context wherein one term may include the other. In accordance with the teachings herein, a data analytics service platform 104 is operative to receive, monitor, obtain, measure, or otherwise determine various pieces of data or information via one or more suitable communication network paths 110 (which may involve network infrastructure including, e.g., a public network such as the Internet, a private network, an enterprise network, a corporate network, or any combination thereof), at least part of which data or information may be relevant with respect to one or more environmental states of the configurable network 108. By way of illustration, example environmental states of the network 108 may comprise one or more states or conditions relating to the network infrastructure, e.g., underlying physical and/or virtual resources, network traffic conditions, etc., as well as the states and conditions relating to the service users or subscribers served by the network 108, including the service user behavior states and user data flows therein. Accordingly, data 106 regarding user states, network states and any internal/external events or conditionalities having a relationship or impact thereon, may be gathered, obtained or monitored by the data analytics platform 104. In one example implementation, the data analytics service platform 104 may be configured as a "Big Data" analytics platform for advantageously analyzing vast amounts of information that may be processed to provide suitable sets of multidimensional data, which may be referred to herein as "profiles", to a network node or subsystem 102. Preferably, the network node or subsystem 102 may be configured to generate one or more controls signals for effectuating suitable dynamic design change actions with respect to (re)configuring the network 108 under a knowledge-based, user-trainable profile analysis and network designer mechanism as set forth in further detail below. Furthermore, in some example implementations, the network node or subsystem 102 may be adapted to interoperate with an Operation Support System (OSS) or, more generally, an orchestrator, of the network domain. In a still further embodiment, one or more aspects of the network node 102 may be integrated within an orchestrator of the network domain.

For purposes of the present application, "Big Data" may be used as a term for a collection of data sets so large and complex that it becomes virtually impossible to process using conventional database management tools or traditional data processing applications in a scalable manner. Challenges involving Big Data may include capture, curation, storage, search, sharing, transfer, analysis, and visualization, etc. Because Big Data available with respect to user states, network states, and other relevant variables (e.g., real-time data relating to the type(s) of flows, content types, content availability and scheduling, network congestion, as well as geographic and other location-based information, etc.) can be on the order of several terabytes to petabytes to exabytes depending on the number of subscribers, complexity of the network, geographic area(s) covered by the network, and the like, it becomes exceedingly difficult to work with using most relational database management systems for optimizing, ranking, correlating and indexing environmental state data in typical environments. In one embodiment, the analytics service platform 104 may be implemented as a programming model framework for processing and analyzing large data sets with a parallel, distributed algorithmic engine that may be executed in a "massively parallel processing" (MPP) architecture with software running on a large number of servers (e.g., a server farm). For example, a MapReduce programming platform may be configured as an implementation of the analytics service platform 104 for analyzing the gathered information and correlating to the subscriber activity and network states. Accordingly, in one example configuration, the data analytics platform 104 may be implemented in an open-source software framework such as, e.g., Apache Hadoop, that is optimized for storage and large-scale processing of data sets on clusters of commodity hardware. In addition, the data analytics platform 104 may also employ suitable machine learning (ML) techniques, support vector machines (SVMs) or support vector networks (SVNs), pattern recognition, artificial intelligence (AI) techniques, neural networks, and the like, for adaptively predicting/learning what variables/information to monitor with respect to the changing environmental states of the configurable network 108. It should be appreciated that although FIG. 1 shows the data analytics service platform 104 as a separate or single entity, such a platform may be disposed at different locations in the network, or distributed across multiple networks or elements, or otherwise at least partially co-located or integrated within an operator network.

Figure 2:
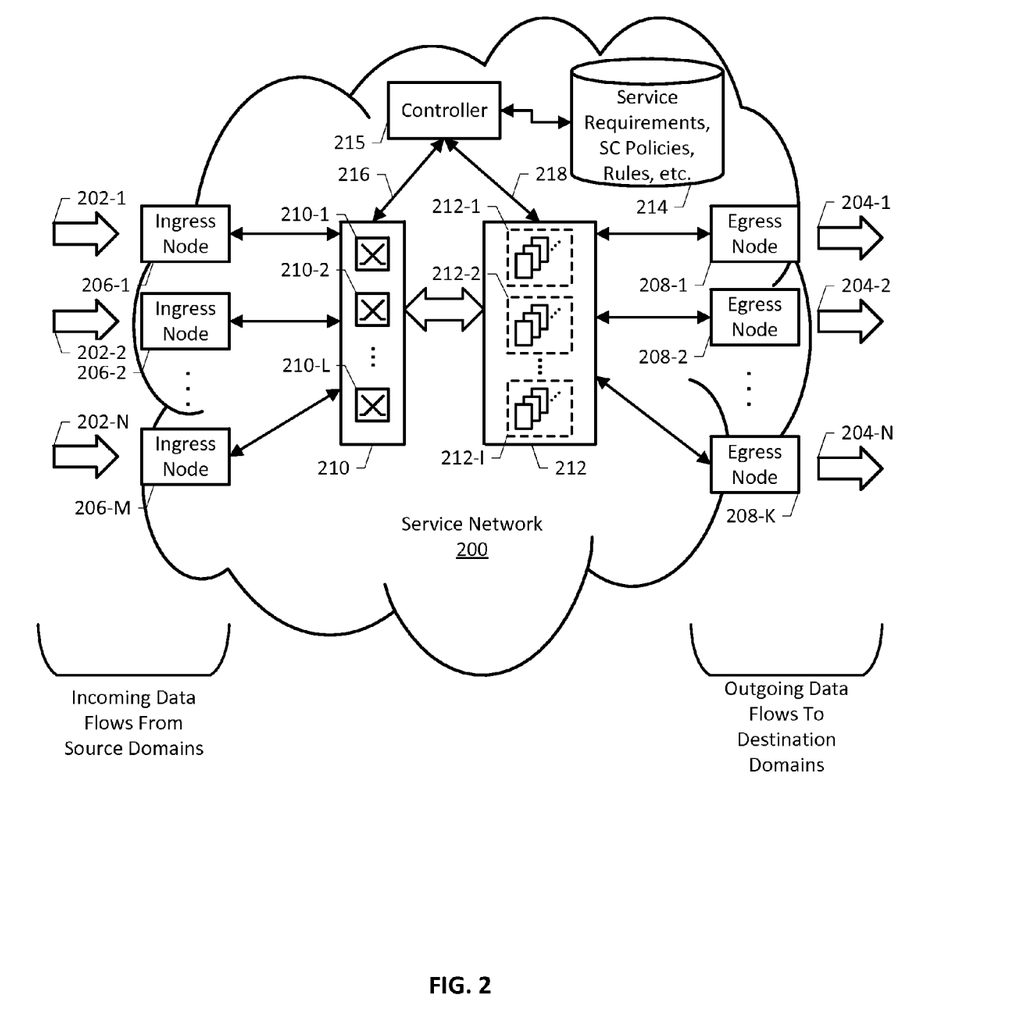
FIG. 2 depicts an example service network that may be configured or reconfigured for effectuating dynamic service chain design according to an embodiment.

FIG. 2 depicts an example service network 200 that may be operative as the configurable network 108 of FIG. 1 in an illustrative embodiment. A plurality of ingress nodes 206-1 to 206-M and a plurality of egress nodes 208-1 to 208-K bound the service network 200, wherein an embodiment of the present patent disclosure may be practiced for purposes of dynamically configuring and/or reconfiguring one or more service chains involving various service functions within the network. Reference numerals 210-1 to 210-L refer to a plurality of data forwarding nodes coupled together in a topological configuration for effectuating routing of incoming data packet flows 202-1 to 202-N received from source domains at the ingress nodes 206-1 to 206-M to the egress nodes 208-1 to 208-K that emit outgoing data packet flows 204-1 to 204-N to external domains. It should be appreciated that the routing of data packets within the network 200 may be effectuated using any known class of routing protocols between any two nodes in the network, such as, e.g., a link-state routing protocol or a distance-vector routing protocol. Reference numerals 212-1 to 212-I refer to one or more inline services that are to be placed or configured within the network 200 which the incoming subscriber data flows 202-1 to 202-N may be required to traverse in a sequential order based on subscriber and/or operator policies, service chaining requirements, and the like. By way of example, such services may comprise Deep Packet Inspection (DPI), Virus Scanning (VS), Intrusion Detection and Prevention (IDP), Firewall (FW) filtering, Network Address Translation (NAT), and the like. Further, one or more of such inline services may be provided in multiple instances or replicas, which may be deployed by the network operator for load-balancing, for example.

By way of illustration, the example service network 200 may be architected as a Software-Defined Network (SDN) based on known protocols such as, e.g., OpenFlow (OF) protocol, Forwarding and Control Element Separation (ForCES) protocol, etc., although it should be appreciated that the embodiments described herein may be practiced in conjunction with other network architectures, including non-SDN architectures, as well. An example SDN architecture typically involves separation and decoupling of the control and data planes of the network elements, whereby network intelligence and state control may be logically centralized and the underlying network infrastructure is abstracted from the applications. One implementation of an SDN-based service network may therefore comprise a network-wide control platform, executing on or more servers in the network, which is configured to oversee and control a plurality of data forwarding nodes or switches. Accordingly, a standardized interfacing may be provided between the network-wide control platform (which may be referred to as a "central controller" for purposes of some embodiments of the present patent application) and the data switching/forwarding nodes, thereby facilitating high scalability, flow-based services chaining, multi-tenancy and secure infrastructure sharing, virtual overlay networking, efficient load balancing, and the like. In contrast, other embodiments may follow an integrated design where the control plane and data-forwarding plane are tightly coupled in the same network element, which usually results in a more complicated control plane and complex network management, with concomitant shortcomings and deficiencies such as diminished scalability, adaptability and resource optimization.

A typical SDN switching node comprises a flow table, which performs packet lookup and forwarding, and a secure channel that connects one or more switches to the central controller, allowing commands and packets to be sent therebetween using an open and standard protocol. The main task of a forwarding element, or a switch, is to forward packets from an ingress port to an egress port, according to the rules in the flow table programmed by the controller. The flow table may contain a set of flow entries, activity counters, and a set of one or more actions to apply to matching packets. For instance, a flow entry may be configured with a set of actions such as: forwarding packets to a given port, modifying certain bits in the packet header, encapsulating packets to the controller, or simply dropping the packets. For the first packet in a new flow, the switch normally forwards the packet to the controller to trigger the new flow entry being programmed. In certain embodiments, a switch can also be used to forward all slow-path packets, e.g., Internet Control Message Protocol (ICMP) packets, to the controller for processing. It should be appreciated that the concept of a data packet flow can be defined broadly, e.g., a Transmission Control Protocol (TCP) connection, or all traffic from a particular Media Access Control (MAC) address or Internet Protocol (IP) address, or all packets with the same Virtual LAN (VLAN) tag, or all packets from the same switch port, or all traffic having one or more user-defined control flags, as well as including any combination of the foregoing conditionalities.

With respect to the example network implementation illustrated in FIG. 2, a network-wide controller 215 may be provided for implementing the control plane operations of the network 200 using a standardized interfacing architecture relative to the remaining network components, as exemplified by interfaces 216, 218. The network controller 215 may be operative to add and remove flow-entries from the flow tables, e.g., as part of defining the interconnection and routing among the set of data plane switches 210. The network controller 215 also handles network state distribution, such as collecting information from, and distributing routing instructions to, the switches. The network controller 215 can also be programmed to support any new addressing, routing, and complex packet processing applications. Accordingly, the network controller 215 may be deemed the "brain" of the example service network 200 (which may also be referred to as a service provider network in certain implementations), wherein a switch may be required to connect to at least one controller functionality in order to operate properly.

It should be appreciated that the ingress and egress nodes of the example network 200 of FIG. 2 are placed at the perimeter of the network 200, wherein the ingress nodes 206-1 to 206-M may be configured to classify an incoming traffic flow and steer it towards the next service based on one or more services chaining (SC) policies, rules and other service requirements (collectively illustrated as service requirements database 214) using a traffic steering mechanism executed by the controller node 215. Additional details regarding an example traffic steering implementation and placement of services in an SDN architecture may be found in one or more of the following commonly owned U.S. patent application(s) and/or issued patents: (i) "SERVICE PLACEMENT FOR INLINE SERVICE CHAINING WITH MULTIPLE INSTANCES", application Ser. No. 14/026,344, filed Sep. 13, 2013, issued as U.S. Pat. No. 8,817,625; (ii) "CHAINING OF INLINES SERVICES USING SOFTWARE DEFINED NETWORKING", application Ser. No. 13/556,456, filed Jul. 24, 2012, published as U.S. Patent App. Publication No.: 2013/0272305; and (ii) "METHOD AND APPARATUS FOR PLACING SERVICES IN A NETWORK", application Ser. No. 13/751,826, filed Jan. 28, 2013, published as U.S. Patent App. Publication No.: 2014/0215074, hereby incorporated by reference herein.

Figure 3:
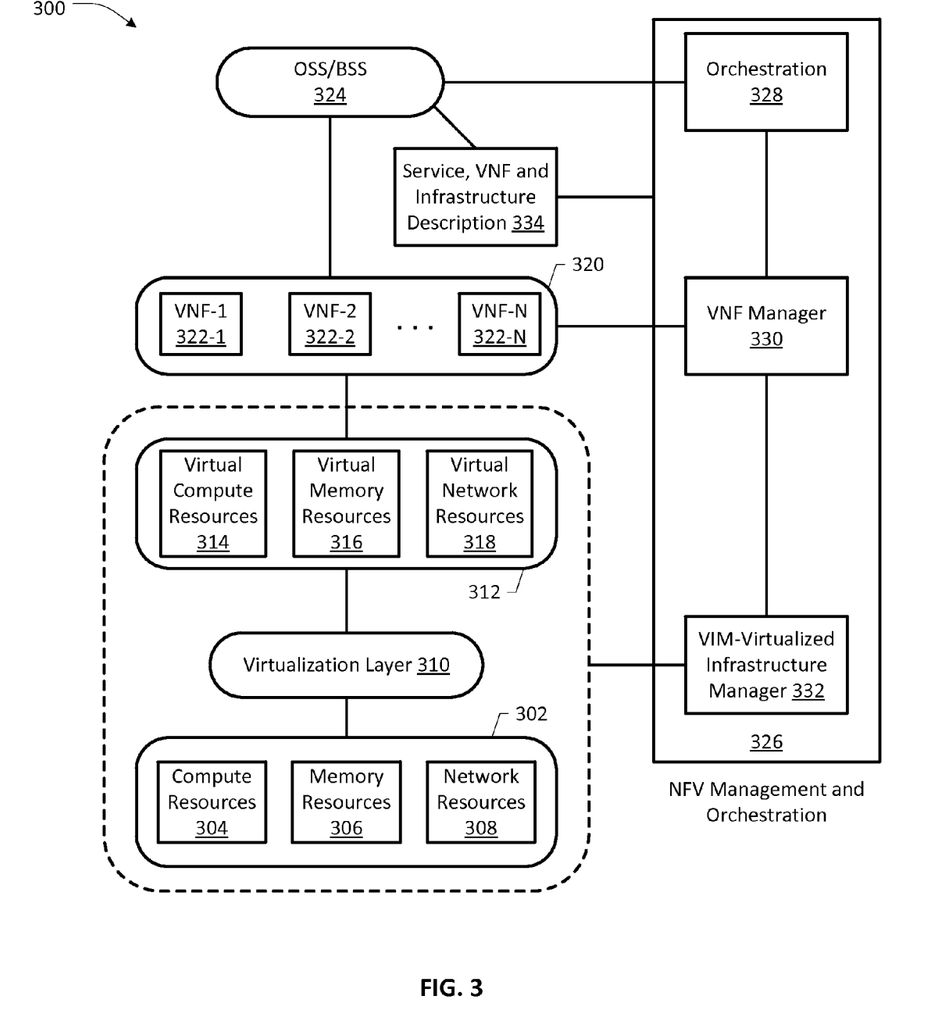
FIG. 3 depicts a network function virtualization (NFV) architecture that may be applied to the example service network of FIG. 2.

FIG. 3 depicts a network function virtualization (NFV) architecture 300 that may be applied to the example service network 200 of FIG. 2. Various physical resources and services executing thereon within the network 200 may be provided as virtual appliances wherein the resources and service functions are virtualized into suitable virtual network functions (VNFs) via a virtualization layer 310. Resources 302 comprising compute resources 304, memory resources 306, and network infrastructure resources 308 are virtualized into corresponding virtual resources 312 wherein virtual compute resources 314, virtual memory resources 316 and virtual network resources 318 are collectively operative to support a VNF layer 320 including a plurality of VNFs 322-1 to 322-N. Virtualization layer 310 (also sometimes referred to as virtual machine monitor (VMM) or "hypervisor") together with the physical resources 302 and virtual resources 312 may be referred to as NFV infrastructure (NFVI) of a network environment. Overall NFV management and orchestration functionality 326 may be supported by a virtualized infrastructure manager (VIM) 332, a VNF manager 330 and an orchestrator 328, wherein VIM 332 and VNF manager 330 are interfaced with NFVI layer and VNF layer, respectively. An Operation Support System (OSS) and/or Business Support System (BSS) component or element 324 is responsible for network-level functionalities such as network management, fault management, configuration management, service management, and subscriber management, etc., which may interface with VNF layer 320 and NFV orchestration 328 via suitable interfaces. In addition, OSS/BSS 324 may be interfaced with a configuration module 334 for facilitating service, VNF and infrastructure description input. Broadly, NFV orchestration 328 involves generating, maintaining and tearing down of network services or service functions supported by corresponding VNFs, including creating end-to-end services over multiple VNFs in the service network (i.e., service chaining for various data flows from ingress nodes to egress nodes). Further, NFV orchestrator 328 is also responsible for global resource management of NFVI resources, e.g., managing compute, storage and networking resources among multiple VIMs in the network.

Based on the foregoing, it should be appreciated that in the context of the present application, a service function (SF) (also sometimes referred to as a network function or NF) is a function that is responsible for specific treatment of received packets of a subscriber data flow. A service function can act at various layers of a protocol stack (e.g., at the network layer or other OSI layers). Furthermore, as a logical component, a service function can be realized as a virtual element or be embedded in a physical network element. In some implementations, one or more service functions can be embedded in the same network element. Also, multiple occurrences or instances of a service function (referred to as replicas hereinabove) can exist in the same administrative domain. Because the physical resources allocated to a VNF are considered to be elastic and the VNFs can run on multiple physical infrastructure network nodes, there is a loose coupling between the VNFs and the physical infrastructure hardware nodes they exist on, which allows greater scalability and dynamic configurability of a virtualized network environment. Although the teachings of the present application are particularly set forth with respect to a virtualized service network wherein an arrangement of virtual SFs (or synonymously, VNFs) may be dynamically (re) configured according to an embodiment, one skilled in the art will recognize that such teachings are also applicable to other network embodiments having embedded functionalities, e.g., embedded SFs, mutatis mutandis. In similar fashion, not all embodiments of the present invention may involve an SDN-based service network.

A service function chain or virtual network function (VNF) chain (which may be commonly referred to herein as an "SC" for short) within an example service network defines an ordered or partially ordered set of abstract service functions and ordering constraints, rules or policies that must be applied to packets so as to steer packet flows through the SF/VNFs that comprise an end-to-end service instantiated by the service chain. As described above with respect to FIG. 2, an atomic example of an abstract service function is a Firewall. Additional examples of VNFs include, but are not limited to, Intrusion Detection and Prevention Systems (IDS/IPS), content filters and optimization mechanisms, DPI, NAT, caching, Lawful Intercept (LI), server load balancing, content distribution nodes (CDNs), etc., at least some which have been referenced hereinabove with respect to the SDN arrangement of FIG. 2. Still further examples in carrier networks include Mobile Core and IMS servers (Mobile Management Entities (MMEs), Packet Data Network Gateways (PGWs), Servicing Gateways (SGWs) and Call Session Control Functions (CSCFs) and Fixed Network servers, such as Digital Subscriber Line Access Multiplexers (DSLAMs).

Typically, the implied order of a service chain in a network may not necessarily be a linear progression as the architecture allows for SCs that copy to more than one branch resulting in a tree- or web-like structure. Also, an example provider network may support service arrangements where there is flexibility in the order in which service functions need to be applied. Whereas the term "service chain" is often used as a shorthand notation for "service function chain", in certain standards and specifications concerning virtualized architectures (e.g., European Telecommunications Standards Institute (ETSI) NFV standards), SCs are also referred to as VNF Forwarding Graphs. It should therefore be noted that an SC or VNF Forwarding Graph is essentially a logical overlay on the underlying network infrastructure path and a link involving one or more VNFs may overlay a number of underlying physical network links. Accordingly, the teachings herein are equally applicable to service architectures according to a number of existing standards and specifications (e.g., ETSI, IETF (Internet Engineering Task Force), ONF (Open Networking Foundation), etc.). Additionally, in certain embodiments of the present application, changing the design of an SC does not in general necessarily mean changing the underlying infrastructure network topology or forwarding behavior. For example, moving a VNF to a different physical host may only affect the overlay service flow path rather than altering the underlying IP network routes.

Figure 4:
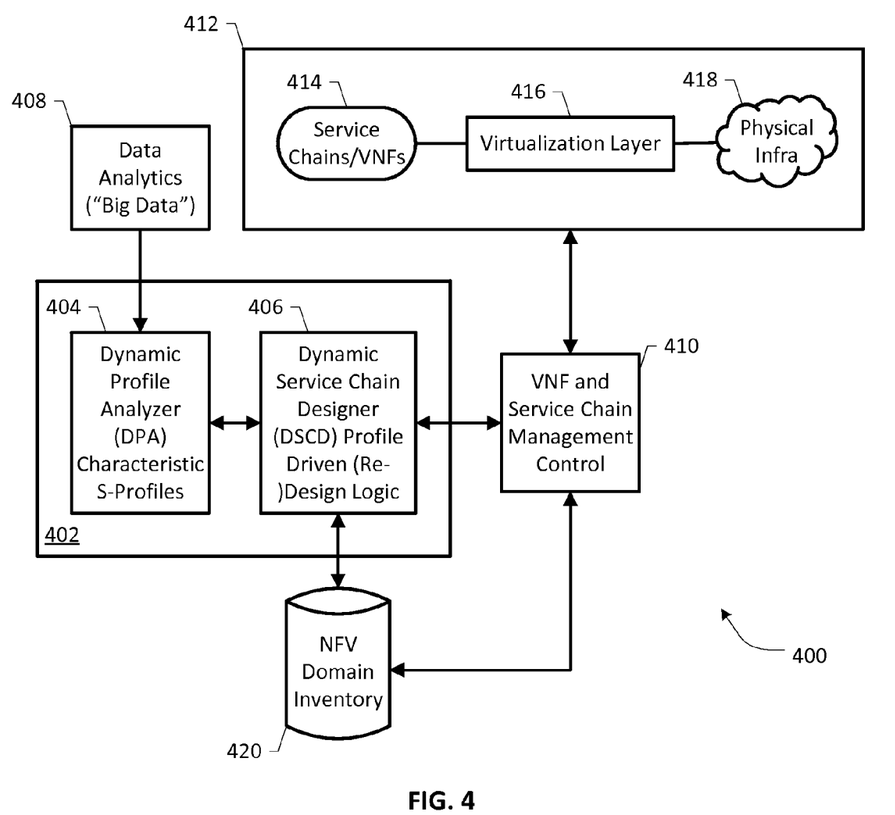
FIG. 4 depicts an analytics-driven network architecture for dynamically configuring or reconfiguring services and/or service chaining in an NFV-based service network of FIG. 2.

FIG. 4 depicts an analytics-driven network architecture 400 for dynamically configuring or reconfiguring service chaining in an NFV-based service network of FIG. 2 according to an embodiment. Advantageously, a network node or subsystem 402 comprising a dynamic profile analyzer (DPA) 404 and a dynamic service chain designer (DSCD) 406 that is operatively coupled to a service chain management control subsystem 410 is provided for receiving dynamic profiles from a data analytics platform 408. As set forth in reference to FIG. 1 above, the data analytics platform 408 may preferably be implemented using Big Data Analytics architecture that may be cloud-based, enterprise network-based, or even be provided as part of a service network. An NFV-based domain 412 is illustrative of a virtualized service network wherein an SC/VNF layer 414 comprising one or more SF/VNFs is implemented by a virtualization layer 416 that abstracts the underlying physical infrastructure resources 418 of the network. An NFV domain inventory database subsystem 420 is operatively coupled to the service chain management control entity 410 and DSCD 406 of the profile analysis/designer node 402 for facilitating data storage with respect to SC management, provisioning, policy management as well as dynamic (re) configuration of the network.

For contextualizing the teachings of an embodiment of an analytics-driven (re)configuration scheme of the present disclosure, one or more multidimensional state spaces spanning at least a portion of the various environmental states relevant to the network, e.g., network states, service user behavior states, data flow states, geographic/location-specific conditions, etc., as pointed out hereinabove in respect of FIG. 1, may be constructed wherein a unique set of state variables in a multidimensional space may be termed a "situation". Formally, a situation $S_i$, is defined as a set or combination of events $[e_i]$, i.e., $S_i = \{e_1, e_2, \ldots, e_N\}$, wherein the events $e_i$ represent network and user states or other state variables exhibiting changes (e.g., threshold crossings). Thus, a particular situation may be considered as an aggregate state of a plurality of events that have relevance to the design of at least a portion of the VNF domain. Corresponding to a particular situation, a "situation profile" may be defined as an N-dimensional vector where events (or representative state variables) may take on specific values. Accordingly, a situation profile $V_i$ corresponding to $S_i$ is a vector:

$$V_i = [Ve_1, Ve_2, \ldots, Ve_N],$$

where $Ve_j$, for $j=1 \ldots N$, are parameters of events $e_j$ and may take Real or Boolean values, and where each value that one of the parameters $Ve_j$ can take corresponds to and quantifies an event [e] that describes a cumulative subscriber and/or network behavior. It should be understood that events may be represented as variables comprising at least one of continuous variables, discrete variables, categorical variables, ordinal variables, real variables, Boolean variables, probabilistic variables and deterministic variables, or a combination thereof. The actual values that quantify or otherwise measure the events of a situation profile may therefore take on suitable values correspondingly. As an example, consider a simple situation $S_J$ that represents an "Emergency situation at traffic junction J". For illustrative purposes, $S_J$ is modeled by two events, $e_1$ and $e_2$, i.e., $$S_J = \{e_1, e_2\},$$

where Event $e_1 = \{$the number (x) of mobile subscribers currently being served at the base station that covers the location J$\}$, where x may be any integer within a range (e.g., [0, 1000]), and Event $e_2 = \{$M is true if the number (y) of emergency calls currently originating from the base station serving junction J is greater than a select threshold, else M is false$\}$, the variable M being Boolean. The corresponding Situation Profile $V_J$ of $S_J$ is then given as:

$$V_J = [x, M]$$

In accordance with the teachings of the present invention, the profile analysis and dynamic network designer system 402 is provisioned with or otherwise maintains a set of distinctive situations that may be referred to as "characteristic situations" that are described by corresponding characteristic situation profiles (CSP), denoted by $V_i^c$, $i=1$ to N, where N is the situation profile (i.e., S-Profile) dimension. At system initialization, an initial empirical set of CSPs may be configured by the operator, for example, via a human domain expert, a trainable knowledge-based expert system, etc. Thereafter, the number of current CSPs in the system may be dynamic and new learned CSPs may be appended to a previous CSP set, which may be used an input to determine dynamic design rules for SC/VNF (re)configuration as will be described below in further detail.

Figure 5:
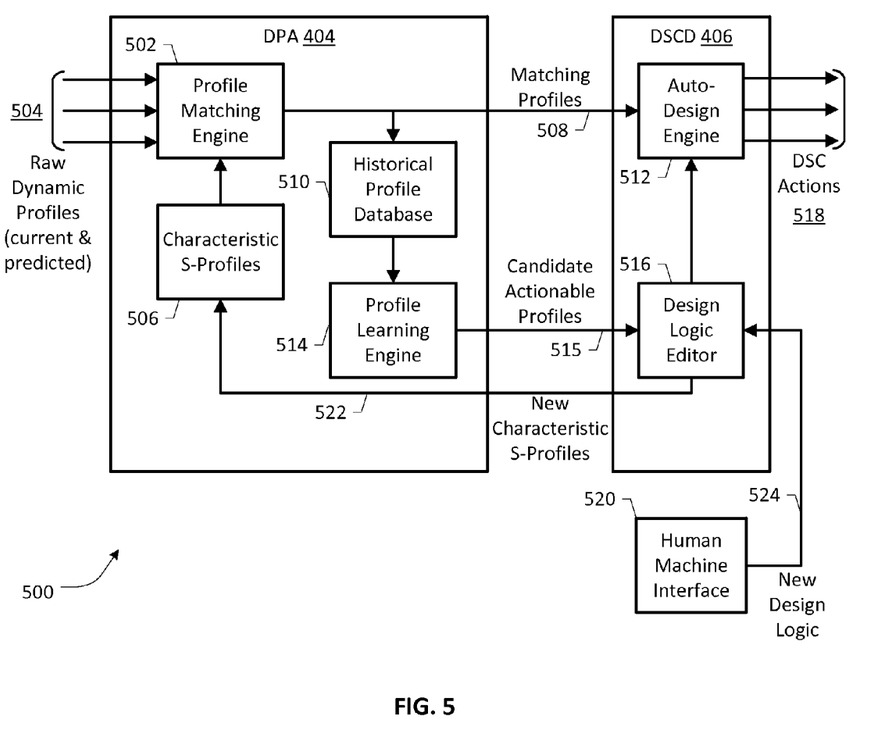
FIG. 5 depicts a block diagram of a network element or subsystem that includes various components for effectuating a network (re)configuration scheme according to an embodiment.

Broadly, the profile analysis and dynamic network designer mechanism of network node 402 may be described by taking reference to FIG. 5, which illustrates additional components of the network node 402 in one particular embodiment. Reference numeral 500 refers to a block diagram of a profile analysis and dynamic network designer node that illustrates various interactions among its constituent components and sub-components in one implementation of the network node 402 shown in FIG. 4. Although the components and sub-components of the embodiment 500 are illustratively shown as part of a single entity, it should be appreciated that the structural components and functionalities may be distributed at different locations in a network architecture. As set forth above in respect of FIG. 4, the data analytics platform 408 analyzes historical and dynamic aggregate subscriber population and network behavior data to dynamically generate parameterized profiles 504 that continuously feed to a profile matching engine 502 of DPA 404. In one embodiment, the profile matching engine 502 executing at DPA 404 is operative to apply suitable multivariate mathematical and statistical analytical techniques to find a degree of similarity or matching (e.g., vector distance) between the received dynamic profiles and existing CSPs, comprising $V^c = \{[P_n], [P_s]\}$, wherein $[P_n]$ represents a plurality of network state events and $[P_s]$ represents a plurality of aggregate subscriber population events. A CSP database 506 may be provided as part of DPA 404 for storing the initial as well as learned CSPs. The profile matching engine 502 is further configured to feed the dynamic profiles 508 that match to the corresponding CSPs (within a degree of tolerance, for example) to an automated or automatic design engine 512 operating at or as part of DSCD 406, which uses them as input conditions for effectuating appropriate design actions 518 based upon suitable design logic, network resource availability, service policies and requirements, etc. By way of illustration, such design actions include "Tune VNF/SC", "Modify VNF/SC", "Scale VNF/SC up", "Scale VNF/SC down", "Clone VNF/SC", "Scale VNF/SC Out", Scale VNF/SC In", etc. as a few examples. Moreover, DPA 404 and/or its profile matching engine 502 is also adapted to store other, non-matching profiles in a historical profile database 510 for online and/or offline processing. Preferably, a profile learning engine 514 operating at or as part of DPA 404 may be configured to execute suitable machine learning techniques such as SVMs or SVNs, pattern recognition, AI techniques, adaptive neural networks, clustering and classification techniques, and the like, for adaptively predicting/ learning and discovering certain profiles that may qualify to be included in the conditions of the dynamic SC design logic. Such profiles may be termed "candidate actionable profiles" (CAPs) 515, which may be provided to or posted on a design logic editor 516 operating at or as part of DSCD 406. In one embodiment, the design logic editor 516 may be provided as a tool with suitable human machine interface 520 (e.g., display, command line interface, etc.) that may be used by a domain expert to define or configure new CSPs based on new, additional and/or alternative design logic 524 that may be provided by the expert. Although a human domain expert may be employed for providing design logic inputs in one arrangement, a suitable knowledge-based expert system that is user-trainable can also be included in another variation wherein online and/or offline processing may be performed under appropriate supervisory evaluation. DSCD 406 and/or its design logic editor 516 is operative to post the new CSPs 522 to the CSP database 506 of DPA 404 where they can be used by the profile matching engine 502 in subsequent matching operations.

Figure 6:
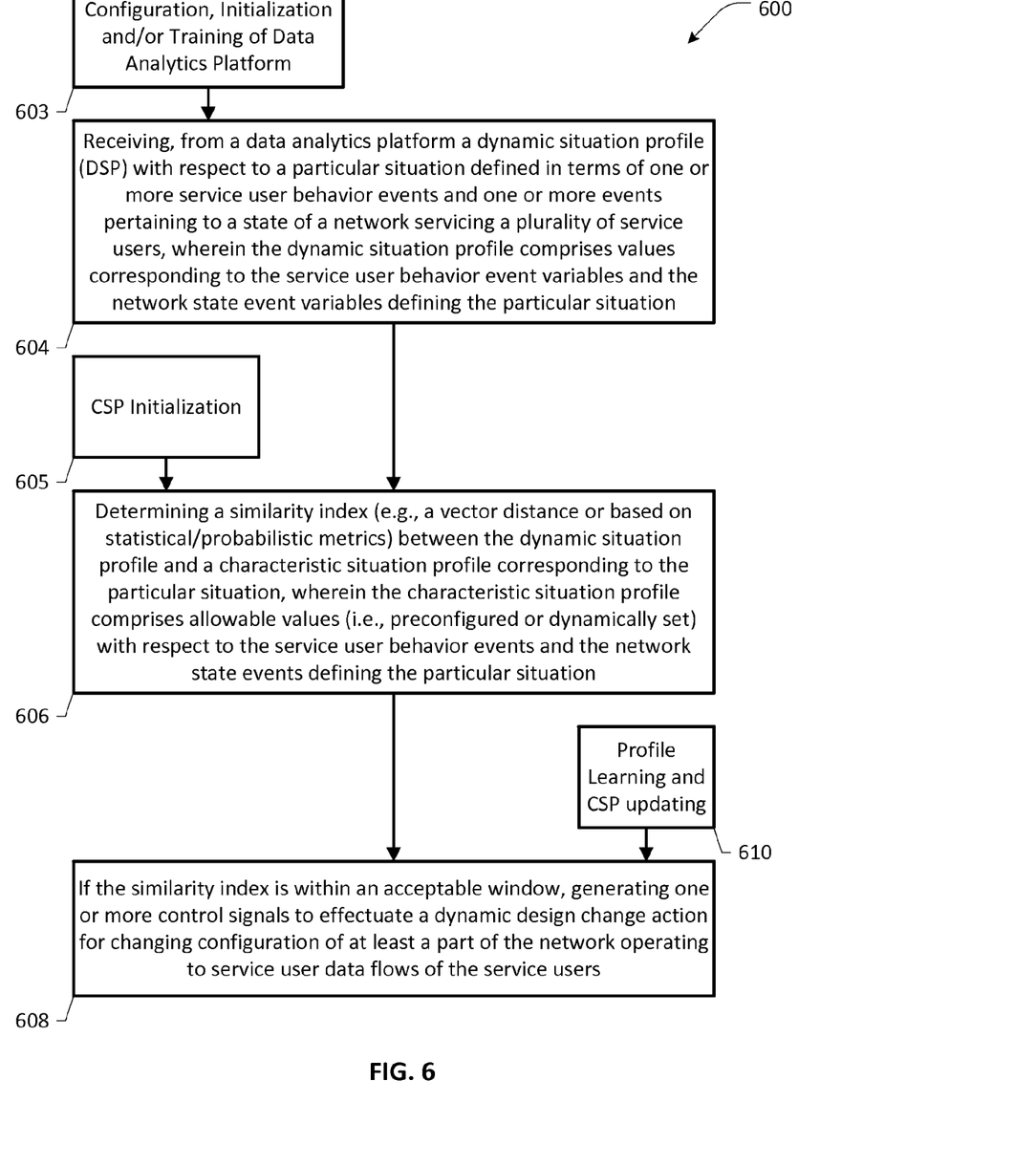
FIG. 6 depicts a flowchart of various blocks, steps, acts and functions that may take place in a network (re)configuration scheme according to an embodiment.

FIG. 6 depicts a flowchart of various blocks, steps, acts and functions that may take place in a network (re)configuration scheme 600 according to an embodiment. At block 604, at least one dynamic situation profile (DSP) with respect to a particular situation is received from a data analytics platform, wherein the dynamic situation profile may be defined in terms of one or more service user behavior events and one or more events pertaining to a state of a network servicing a plurality of service users. Further, as described above, the dynamic situation profile provided by the data analytics platform comprises actual values corresponding to the service user behavior events and the network state events defining the particular situation. A similarity index may be determined between the dynamic situation profile and a characteristic situation profile (CSP) corresponding to the particular situation, wherein the characteristic situation profile comprises allowable values (e.g., threshold values) with respect to the service user behavior events and the network state events defining the particular situation (block 606). If the similarity index is within an acceptable window, one or more control signals may be generated to effectuate a dynamic design change action for changing configuration of at least a part of the network operating to service user data flows of the service users (block 608). In one variation, the data analytics platform may be trained via adaptive learning to facilitate generating appropriately parameterized data relative to the situations defined for network (block 603). Similarly, an initial CSP set may be provisioned or otherwise configured in order to facilitate profile matching evaluations in the beginning stages of the process (block 605).

In an optional arrangement, a profile learning and CSP updating process 610 may be included that may be performed either online, offline, real-time, or in some batch mode, in a configurable manner. A historical profile database may include not only the dynamic profiles that did not match corresponding CSPs but also indications of the matching profiles that may be provided to a trainable profile learning scheme.

As pointed out previously, a similarity index between the dynamic situation profile and the characteristic situation profile may be obtained as a multidimensional vector or metric distance using a variety of techniques. For example, such "distances" may comprise at least one of Euclidean distances, Hamming distances, Chebychev distances, Minkowsky distance, Mahalanobis distances and Bhattacharyya distances, etc. Further, various "inner product" type techniques (e.g., covariance) may also be used in estimating or otherwise measuring a degree of similarity or dissimilarity (which can be a deterministic estimate or a probabilistic estimate) between the two profiles' events data. Furthermore, the dimensionality of a received dynamic situation profile and the corresponding characteristic situation profile need not necessarily be the same for purposes of measuring similarity or distance.

Example applications of the foregoing teachings may be illustrated by taking reference to a few simple use case scenarios. In the example of a situation $S_J$ describing the number of mobile users and the number of emergency calls at a traffic junction J as set forth hereinabove, the corresponding CSP may be defined as:

$$V^c{}_J = [x=500, M=1]$$

That is to say, a CSP corresponding to an "emergency situation at junction J" is defined as ($\geq$) 500 subscribers being connected to the serving base station and at least two emergency calls taking place. Here the Boolean variable M=1, meaning logic True or high, although an inverse logic value may also be used in another embodiment. It should also be noted that parameters can take real values; therefore a probabilistic characterization of events and situations is also possible. Accordingly, in one embodiment, when a dynamic situation profile (DSP) corresponding to $S_J$ is received by the profile matching engine, it may be analyzed to check if it matches or crosses the threshold values established in the above CSP, whereupon a suitable dynamic design change action may be effectuated.

In another more evolved yet simple example that uses additional capabilities of a data analytics platform, a CSP may involve more complex and dynamic parameters or variables. For example, for the same Situation $S_J$ above, consider the following events $e_3$ and $e_4$:

$e_3$={there are currently x mobile subscribers more than average at a particular time of day at the base station serving junction J}

$e_4$={M is true if there are more emergency calls (by a specified number, e.g., y=2) than the average number of emergency calls originating across base stations with close utilization statistics, e.g., average and variance, to the base station serving junction J, else M is false}.

A corresponding example Characteristic Profile $V^{c2}{}_J$ of $S_J$ may be set as below:

$$V^{c2}{}_J = [x=20, M=1]$$

When a received DSP is compared against this CSP and if there is a match and/or the established thresholds are crossed, a suitable design change action may be generated by the system accordingly.

In a still further use case scenario with a more elaborate setting, the following conditionalities may be considered: (i) the data analytics platform is operative to characterize the subscriber population based on online behavior patterns and classify them into "early adopters", "majority" and "laggards" with respect to adopting a particular new technological device; (ii) the data analytics platform is also operative to characterize the subscriber population according to their recent (e.g., last month) electronic device (smartphone, printer, tablet, etc.) interests; (iii) the NFV domain operator offers a service to advertisers where the streamed advertisement content adapts to the current online subscriber home and mobile viewers' population profiles and preferences and the streamed contents shown (e.g., sports, sci-fi films, musical shows, etc.); and (iv) to avoid over-engineering cloud resource allocation (e.g., compute resources, storage resources, network resources, or any combination thereof) to any particular kind of advertisement content, the required resources are VNF-based and are created, consumed, and extinguished according to optimal advertising effect rules. Consider the Situation $S_k$ named "Advertise new SmartTV during NBA game" that is defined as below:

$$S_k = \{e_1, e_2, e_3, e_4\},$$

where $e_1$={less than x days to Black Friday}
$e_2$={more than y viewers watching NBA playoffs in City X tonight}
$e_3$={the ratio of early adopters in City X is currently z %}
$e_4$={the average online search intensity for TVs is N out of 10 in the last M days}

A Situation Profile (S-Profile) for $S_k$ may then be set as below:

$$V_k=[x,y,z,N,M]$$

wherein a corresponding CSP profile may be defined as the following:

$$V^c{}_k=[10,100000,20\%,7,10]$$

A dynamic design action may be established to create new resources for broadcasting a smartTV advertisement just for the viewers of the NBA game of City X within the next 10 minutes. Example dynamically configurable VNF resources may include replicating content to new temporary VNF storage server, via a temporary VNF streamer, and setting up overlay path(s) between VNF servers and a point of presence (POP) node for City X.

To further demonstrate how such a design action could be recommended by the system as a candidate S-Profile, consider the additional event: e5={true if early adopters from City X bought new TVs around the time of NBA playoffs}. Then raw values of the profile containing the extra parameter, i.e., [x, y, z, N, M, q], can be provided to a clustering algorithm that can determine the nearest vector cluster center where q=True. Such a clustering analysis can provide appropriate event parameter values that may then be used to formulate a $V^c{}_k$ as the corresponding CSP.

In view of the foregoing, an embodiment of a profile analysis and dynamic network designer subsystem (e.g., as depicted in FIGS. 4 and 5) may involve two main process flows: (i) a real-time dynamic chain design process flow that is concerned with generating appropriate design change actions based on incoming DSPs, and (ii) an offline CSP update flow for adaptively learning new CSPs based on historical profiles. It should be appreciated that these process flows may be also executed in a single flow, e.g., two parallel flows on a real-time basis. To recapitulate, a real-time dynamic design chain flow involves the following:

(A) The data analytics platform continuously feeds the DPA element with dynamic situation profiles, which may be represented as event vectors corresponding to the environmental states of design interest.

(B) In DPA, the profile matching engine uses techniques such as vector analysis to estimate an appropriately defined distance of the incoming raw profile vectors to corresponding CSPs. If the matching distance or similarity index lies within some predefined tolerance, the matching profiles and/or the indications of the matching result may be forwarded to DSCD component. As pointed out previously, examples of vector distance include Euclidean, Hamming, Mahalanobis or other vector distance definition, depending on the vector analysis technique used.

(C) In DSCD, an auto-design engine contains design rules whose conditions are evaluated based on the occurrence of individual CSPs or combinations thereof, which effectuate suitable design change actions relative to the network.

As to the CSP update/learning flow, an embodiment may involve the following:

(A) In DPA, non-matching profiles may be stored in a historical profile database, e.g., for offline post-processing. The profile learning engine uses machine learning methods such as, e.g., clustering (k-means, support vector machines, hierarchical clustering, etc.) and classification (Bayesian, feature vectors, etc.) techniques, as described hereinabove. The output of this analysis comprises candidate actionable profiles (CAPs), i.e., profile vectors that can adequately represent clusters of frequently occurring similar (or close) profile vectors and, as such, show the potential to represent CSPs. Such CAPs may be forwarded to the DSCD component.

(B) In DSCD, the CAPs may be posted on the design logic editor that may be used by a human domain expert. Preferably, the design logic editor can be used to incorporate the posted CAPs into the set of CSPs and plug in conditional expressions of existing or new automatic design rules and map them to appropriate design actions. Further, the design logic editor may also be used by the human expert to define new rules based on CSPs and map them to corresponding actions from scratch.

In broad terms, design change actions may be classified, but not limited, into the following general groups: (i) dynamic VNF topology design (e.g., placement of SF/VNFs or assignment of service nodes in a chain, (re)instantiation of additional VNFs, etc.); (ii) dynamic service chain network/topology design (e.g., (re)arranging the order or sequence of VNFs in a service chain); (iii) dynamic VNF management and orchestration, which also enables dynamic capacity planning and dynamic resource management (e.g., VM capacity management); and (iv) dynamic service chain management and orchestration (e.g., adding or terminating various end-to-end service chains within the network). In addition to the example design change actions set forth elsewhere in the present patent application, the following example actions may also be implemented in additional exemplary embodiments: (i) Tune Service Chaining—e.g., add a new DPI field based on the analytics-driven new dynamic profiles; (ii) Alter Service Chain VNF Members—e.g., add a new Security Service Function in Service Chain to prevent Distributed Denial-of-Service (DDOS) attacks based on information retrieved from analytics driven new dynamic profiles or set up Service Chain with minimal service functions to cater to Emergency traffic; (iii) Scaling (Autoscaling or triggered) Service Functions within Service Chains—e.g., add a new virtual DPI server to accommodate the traffic (e.g., based on number of connections) in a particular geographical location; (iv) Clone Service Chains—e.g., for distributing resource demand over different geographical locations; and (v) Re-route Service Chains—e.g., perform load balancing.

Figure 7:
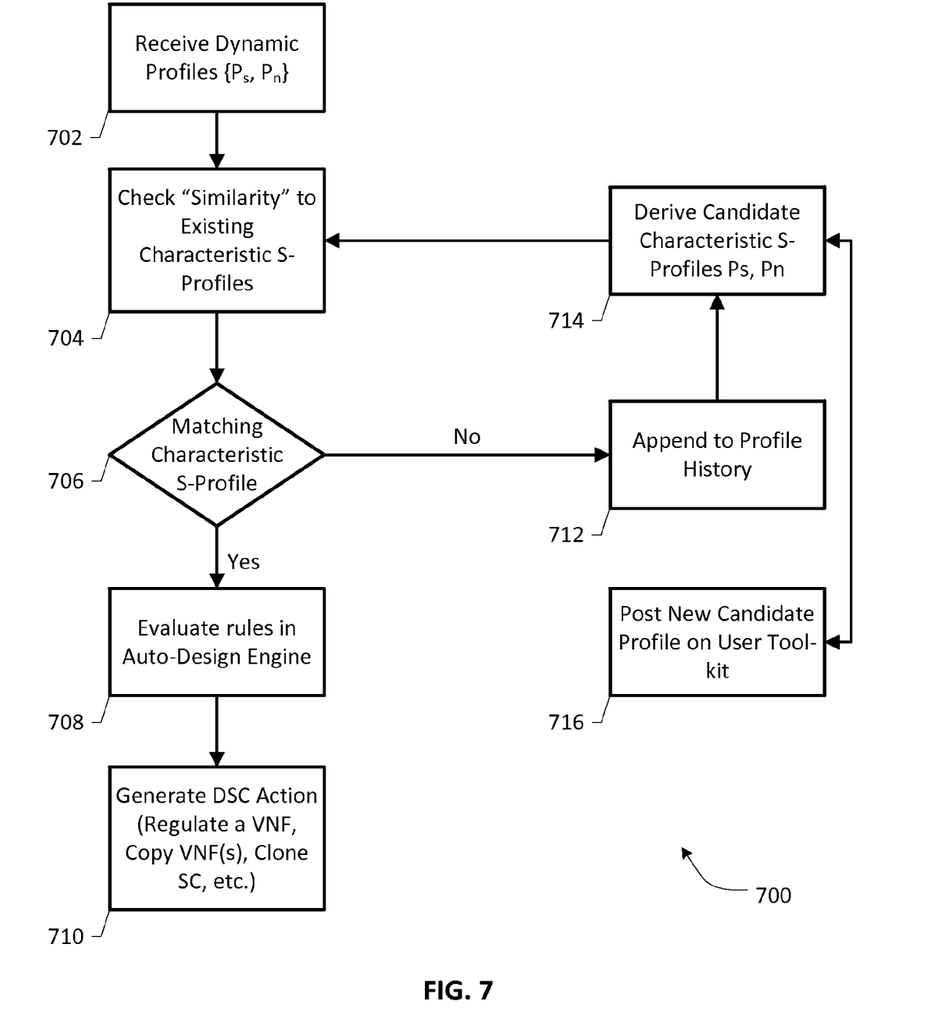
FIG. 7 depicts a flowchart of various blocks, steps, acts and functions that may take place in a network (re)configuration scheme according to another embodiment.

FIG. 7 depicts a flowchart of various blocks, steps, acts and functions that may take place according to another embodiment wherein both online and offline process flows are integrated into a network (re)configuration and CSP learning scheme 700. At block 702, dynamic situation profiles $\{[P_n], [P_s]\}$ are received, wherein $[P_n]$ represents a plurality of network state events and $[P_s]$ represents a plurality of aggregate subscriber population events. A similarity measurement, value, index, indicium, or metric is checked between the DSPs and existing CSPs (block 704). Upon determining that there is a matching (within a guard band, for example), design rules in an Auto-Design engine are evaluated in view of the matched profiles (blocks 706, 708). Appropriate dynamic service chain (DSC) action such as, e.g., regulate a VNF, copy VNF(s), cloning of a chain, etc. may then be effectuated (block 710). Where the received DSPs do not match corresponding CSPs, they are appended to or stored in a profile history database (block 712), from which candidate profiles may be generated, derived, determined or otherwise obtained (block 714). As discussed above, the candidate profiles may be developed into new CSPs under supervisory evaluation, which new CSPs may be added to the CSP database for subsequent matching analyses. The new candidate profiles may also be posted to a user tool-kit for further evaluation (block 716).

Figure 8:
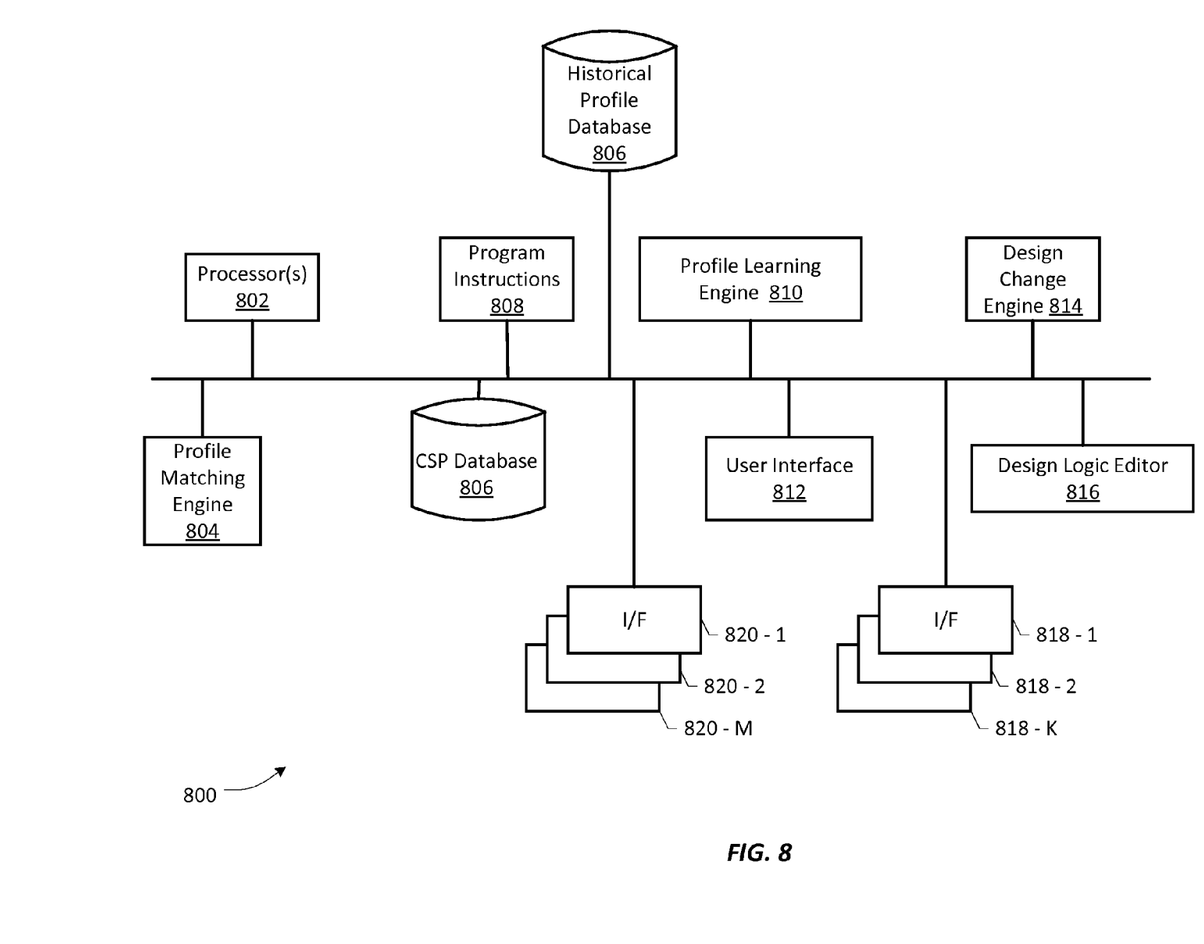
FIG. 8 depicts a block diagram of a network element or subsystem that may be configured to interoperate in an analytics-driven network architecture according to an embodiment of the present patent disclosure.

FIG. 8 depicts a block diagram of an apparatus 800 that may be configured to interoperate in an analytics-driven network architecture according to an embodiment of the present patent disclosure. It should be appreciated that apparatus 800 may be implemented as a network node or element for realizing at least a portion of a profile analysis and dynamic network designer subsystem set forth above in respect of the embodiments shown in FIG. 1, 4 or 5. Depending on the implementation, apparatus 800 may be configured as DPA component, DSCD component, or a combination of both. Accordingly, a profile matching engine 804, a profile learning engine 810, a design change engine 814 as well as a design logic editor 816 may be provided in any suitable combination for interoperating according to one or more embodiments set forth herein under the control of one or more processors 802 and applicable program code or instructions 808 provided in a persistent memory. A CSP database 806 as well as a historical profile database 806 may also be included in an embodiment of apparatus 800, although such databases may be provided elsewhere in a network. Interfaces 820-1 to 820-M are representative of network interfaces that a DPA arrangement of apparatus 800 may utilize in accessing one or more components of a distributed data analytics platform for receiving dynamic situation profile data as well as coupling to a DSCD arrangement (that is not part of apparatus 800). In similar fashion, interfaces 818-1 to 818-K represent network interfaces that a DSCD arrangement of apparatus 800 may utilize for coupling to a DPA arrangement (that is not part of apparatus 800) as well as appropriate service chain management and control element(s) of a configurable network. A user interface 812 may be provided for facilitating interactions by a human domain expert as part of the design logic editor 816. Although not explicitly shown in this FIG., one skilled in the art will recognize that appropriate memory storage may be also provided for storing design rules, policies, service chain requirements, etc. with respect to subscriber data flows in the network. Accordingly, depending on the context, interfaces selected from the foregoing interfaces may sometimes be referred to as a first interface, a second interface, and the like in a particular embodiment. Moreover, the hardware resources and DPA/DSCD functionalities of the apparatus 800 may themselves be at least partially virtualized in alternative or additional arrangements.

Based upon the foregoing Detailed Description, it should be appreciated that embodiments of the present disclosure provide a method and system that leverages Big Data Analytics to dynamically derive suitable rules for the creation and design of service chains including configuration, ordering, dimensioning and assignment of their component VNFs. Such (re)design actions are advantageously provided as operations that may be performed by considering the end-to-end service as a whole in response to dynamic, possibly composite events provided by the analytics platform. Service chain (re)design according to the teachings herein may typically change one or more VNFs and, as a result, the SC functional characteristics as a whole (e.g., capacity, quality etc.). Moreover, it may impact the treatment of all existing or arriving flow aggregates related to the SC in a provider network. It should be appreciated that the (re)design paradigm captured in the embodiments herein is contrary to the mere action of steering an individual subscriber's traffic flow through a static SC based on the subscriber's service requirements. Instead, the dynamic SC (re)design methodology of the present disclosure adapts the SCs and associated traffic in a network according to the real-time conditions monitored and curated by the Big Data Analytics. Furthermore, the teachings set forth herein are also applicable to multi-cloud and hybrid virtual/physical node networks.

Additional advantages of the embodiments of the present patent disclosure may be cataloged as follows: (i) Requirement Diversity: Using aggregate subscriber population profiling to guide NFV and SC design and (re)configuration as opposed to techniques that merely use individual subscriber flow requirements. Subscriber population profiles can be used in the embodiments to capture a richer set of requirements than just traffic flow performance. For example, subscriber geography trends, application trends, or subscriber and service trends can project service demands and make more informed design decisions. (ii) Faster Design Convergence: Profile aggregation supports SC design using cumulative trends rather than incremental optimization based on incoming flows. (iii) Design Adaptability: Dynamic SC design based on real-time and/or up-to-date historical subscriber behavior profiling corresponds better to current subscriber requirements rather than those previously registered. (iv) Design Proactivity: Capability to leverage predictive analytics so as to act proactively on expected events. (v) Design Diversity: Capability to combine subscriber and network events in design decisions.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and blocks from different flowcharts may be combined, rearranged, and/or reconfigured into additional flowcharts in any combination or subcombination. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, module, element, step, act, or function is essential such that it must be included in the scope of the claims. Reference to an element in the singular is not intended to mean "one and only one" unless explicitly so stated, but rather "one or more" or "at least one". All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A network configuration method, comprising:
adaptively training a computer-implemented data analytics platform for generating dynamic situation profiles with respect to a plurality of situations observed in a network serving a plurality of service users;
receiving, from the computer-implemented data analytics platform, a dynamic situation profile with respect to a particular situation defined in terms of one or more service user behavior events and one or more events pertaining to a state of the network servicing the plurality of service users, wherein the dynamic situation profile comprises values corresponding to the service user behavior events and the network state events defining the particular situation;
determining a similarity index between the dynamic situation profile and a characteristic situation profile corresponding to the particular situation, wherein the characteristic situation profile comprises allowable values with respect to the service user behavior events and the network state events defining the particular situation;
if the similarity index is within an acceptable window, generating one or more control signals to effectuate a dynamic design change action for changing configuration of at least a plurality of inline service nodes disposed in the network operating to service user data flows of the service users in accordance with corresponding service chain policies, each service chain policy comprising an ordered sequence of inline services to be traversed by a corresponding user data flow between an ingress node and an egress node of the network; and
if the similarity index is not within the acceptable window, providing the dynamic situation profile to a profile learning engine that facilitates generating new characteristic situation profiles in an offline operation, wherein the profile learning engine comprises computer program instructions executed by a processor circuit to implement one selected from the group consisting of machine learning (ML) techniques, support vector machines (SVMs), support vector networks (SVNs), pattern recognition, artificial intelligence (AI) techniques and neural networks.

2. The method as recited in claim 1, wherein the inline service nodes are operative to host a plurality of virtualized service functions and further wherein the design change action comprises at least one of instantiating a new virtualized service function, rearranging one or more existing virtualized service functions, generating one or more instances of an existing virtualized service function, cloning an existing service chain of one or more virtualized service functions, rerouting an existing service chain of one or more virtualized service functions, instantiating additional virtual machine resources, and removing one or more virtualized service functions.

3. The method as recited in claim 1, wherein one or more of the service user behavior events and the network state events are represented as variables comprising at least one of continuous variables, discrete variables, categorical variables, ordinal variables, real variables, Boolean variables, probabilistic variables and deterministic variables.

4. The method as recited in claim 1, wherein the dynamic situation profile and the characteristic situation profile each comprise a vector.

5. The method as recited in claim 1, further comprising: generating the new characteristic situation profiles responsive to a supervisory evaluation.

6. The method as recited in claim 5, wherein the supervisory evaluation is received from at least one of a knowledge-based expert system and a human domain expert.

7. The method as recited in claim 1, wherein the network is configured as a Software-Defined Network (SDN) based on one of OpenFlow protocol and Forwarding and Control Element Separation (ForCES) protocol.

8. The method as recited in claim 1, wherein the similarity index between the dynamic situation profile and the characteristic situation profile is obtained as a vector distance comprising at least one of a Euclidean distance, a Hamming distance, a Chebychev distance, a Minkowsky distance, a Mahalanobis distance and a Bhattacharyya distance.

9. The method as recited in claim 1, wherein the similarity index between the dynamic situation profile and the characteristic situation profile is obtained based on a probabilistic dissimilarity between the two profiles' events data.

10. The method as recited in claim 1, further comprising:
initializing a set of characteristic situation profiles corresponding to a number of predefined situations; and
updating the set of characteristic situation profiles based on supervisory evaluation of dynamic situation profiles received from the computer-implemented data analytics platform.

11. A network system, comprising:
an adaptively trainable computer-implemented data analytics platform configured for generating dynamic situation profiles with respect to a plurality of situations observed in a network serving a plurality of service users;
a profile analyzer comprising computer program instructions executed by a processor circuit operative to receive from the computer-implemented data analytics platform a dynamic situation profile with respect to a particular situation defined in terms of one or more service user behavior events and one or more events pertaining to a state of the network servicing the plurality of service users, wherein the dynamic situation profile comprises values corresponding to the service user behavior events and the network state events defining the particular situation;
a matching module associated with the profile analyzer, the matching module comprising computer program instructions executed by a processor circuit for determining a similarity index between the dynamic situation profile and a characteristic situation profile corresponding to the particular situation, wherein the characteristic situation profile comprises allowable values with respect to the service user behavior events and the network state events defining the particular situation; and
a dynamic service chain designer comprising computer program instructions executed by a processor circuit which is responsive to receiving an indication that the similarity index between the dynamic situation profile and the characteristic situation profile is within an acceptable window, operative for generating one or more control signals to effectuate a dynamic design change action for changing configuration of at least a plurality of inline service nodes disposed in the network operating to service user data flows of the service users in accordance with corresponding service chain policies, each service chain policy comprising an ordered sequence of inline services to be traversed by a corresponding user data flow between an ingress node and an egress node of the network, wherein, if the similarity index is not within the acceptable window, the dynamic situation profile is provided to a profile learning engine that facilitates generating new characteristic situation profiles in an offline operation wherein the profile learning engine comprises computer program instructions executed by a processor circuit to implement one selected from the group consisting of machine learning (ML) techniques, support vector machines (SVMs), support vector networks (SVNs), pattern recognition, artificial intelligence (AI) techniques and neural networks.

12. The network system as recited in claim 11, wherein the inline service nodes are operative to host a plurality of virtualized service functions and further wherein the design change action comprises at least one of instantiating a new virtualized service function, rearranging one or more existing virtualized service functions, generating one or more instances of an existing virtualized service function, cloning an existing service chain of one or more virtualized service functions, rerouting an existing service chain of one or more virtualized service functions, instantiating additional virtual machine resources, and removing one or more virtualized service functions.

13. The network system as recited in claim 11, wherein one or more of the service user behavior events and the network state events are represented as variables comprising at least one of continuous variables, discrete variables, categorical variables, ordinal variables, real variables, Boolean variables, probabilistic variables and deterministic variables.

14. The network system as recited in claim 11, wherein the dynamic situation profile and the characteristic situation profile each comprise a vector.

15. The network system as recited in claim 11, wherein the new characteristic situation profiles are generated responsive to a supervisory evaluation.

16. The network system as recited in claim 15, wherein the supervisory evaluation is received from at least one of a knowledge-based expert system and a human domain expert.

17. The network system as recited in claim 11, wherein the network is configured as a Software-Defined Network (SDN) based on one of OpenFlow protocol and Forwarding and Control Element Separation (ForCES) protocol.

18. The network system as recited in claim 11, wherein the matching module is configured to generate a similarity index between the dynamic situation profile and the characteristic situation profile that is obtained as a vector distance comprising at least one of a Euclidean distance, a Hamming distance, a Chebychev distance, a Minkowsky distance, a Mahalanobis distance and a Bhattacharyya distance.

19. The network system as recited in claim 11, wherein the matching module is configured to generate a similarity index between the dynamic situation profile and the characteristic situation profile that is obtained based on a probabilistic dissimilarity between the two profiles' events data.

20. The network system as recited in claim 11, further comprising:
a database including a set of initial characteristic situation profiles corresponding to a number of predefined situations, wherein the set of characteristic situation profiles is updated based on supervisory evaluation of dynamic situation profiles received from the computer-implemented data analytics platform.

21. The network system as recited in claim 11, wherein at least one of the profile analyzer, the matching module and the dynamic service chain designer is implemented as a virtual network function.

22. The network system as recited in claim 11, wherein the profile analyzer, the matching module and the dynamic service chain designer are configured to interoperate with an orchestrator node associated with the network.

23. The network system as recited in claim 11, wherein the profile analyzer, the matching module and the dynamic service chain designer are configured to operate as an orchestrator node associated with the network.

24. A non-transitory computer-readable medium containing instructions stored thereon which, when executed by a computer system, are configured to perform the acts:

adaptively training a computer-implemented data analytics platform for generating dynamic situation profiles with respect to a plurality of situations observed in a network serving a plurality of service users;

upon receiving, from the computer-implemented data analytics platform, dynamic situation profiles with respect to one or more service user behavior events and one or more events pertaining to a state of the network servicing a plurality of service users, determining if the dynamic situation profiles match corresponding characteristic situation profiles, wherein the characteristic situation profiles comprises threshold values with respect to the service user behavior events and the network state events;

forwarding one or more dynamic situation profiles that match the corresponding characteristic situation profile to a design action module comprising computer program instructions executed by a processor circuit for generating appropriate control signals for changing configuration of at least a plurality of inline service nodes disposed in the network operating to service user data flows of the service users in accordance with corresponding service chain policies, each service chain policy comprising an ordered sequence of inline services to be traversed by a corresponding user data flow between an ingress node and an egress node of the network; and providing one or more dynamic situation profiles that do not match the corresponding characteristic situation profiles to a profile learning engine that facilitates generating new characteristic situation profiles in an offline operation wherein the profile learning engine comprises computer program instructions executed by a processor circuit to implement one selected from the group consisting of machine learning (ML) techniques, support vector machines (SVMs), support vector networks (SVNs), pattern recognition, artificial intelligence (AI) techniques and neural networks.

* * * * *